Figure 1:
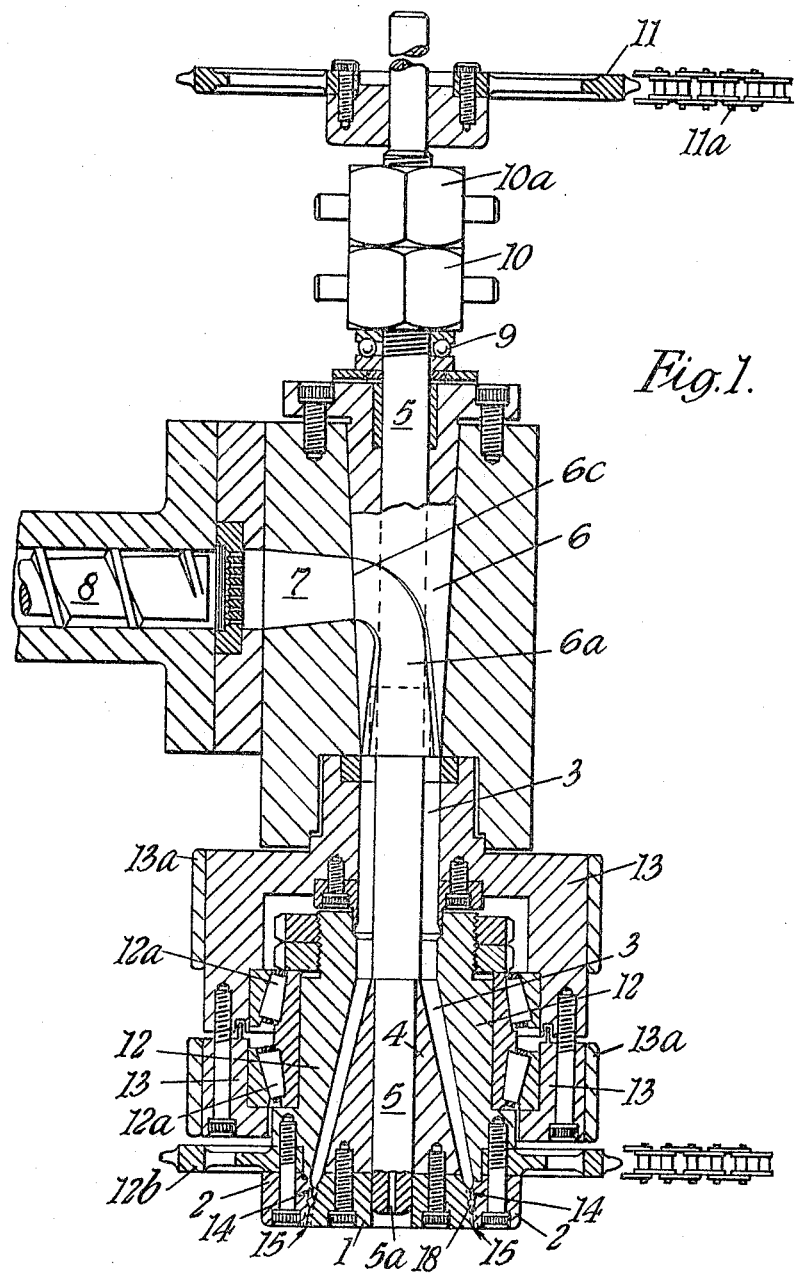

Sept. 6, 1966  F. B. MERCER  3,270,370
EXTRUDED PLASTIC NET
Filed Oct. 30, 1963  2 Sheets-Sheet 2
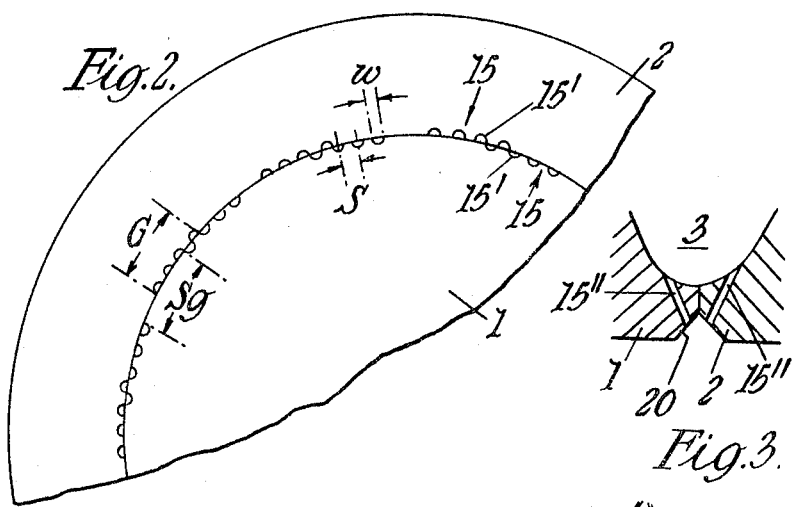
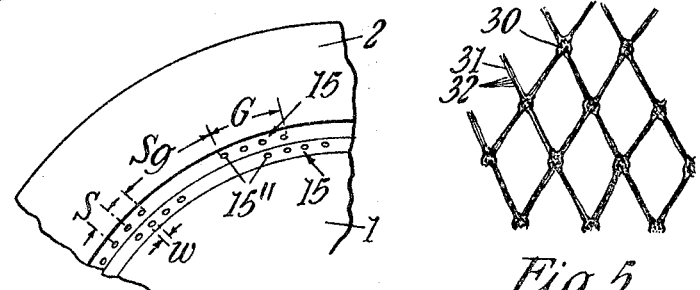
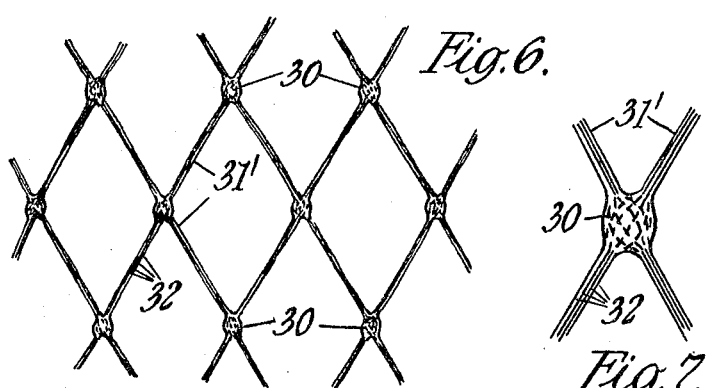
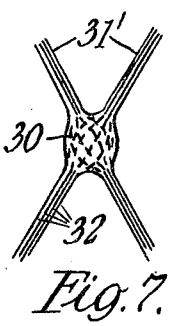

United States Patent Office 3,270,370
Patented Sept. 6, 1966

3,270,370
EXTRUDED PLASTIC NET
Frank Brian Mercer, Blackburn, England, assignor to Plastic Textile Accessories Limited, Blackburn, England, a British company
Filed Oct. 30, 1963, Ser. No. 320,031
Claims priority, application Great Britain, Nov. 6, 1962, 41,964/62
3 Claims. (Cl. 18—12)

This invention relates to the extrusion of integral (i.e., knotless) plastic netting in tubular or cylindrical form by methods and apparatus of the character described in our British patent specification No. 836,555.

According to the above application, netting is extruded through circumferentially extending die means formed between a pair of extrusion members or dies (hereinafter referred to as die members) having co-axial surfaces adjacent the die means and in sliding contact with one another to form a bearing slideway, one or both of the die members being given continuous rotary or oscillatory motion. The die means are supplied with plastic from a pressure supply chamber through feed ducts, which may be formed in or through one or both of the contacting co-axial surfaces of the die members and which communicate with the chamber and with the die means.

The die means comprise in each die member a plurality of circumferentially spaced extrusion die orifices, such that when the die orifices in one die member are in register with the die orifices in the other member net intersections are extruded and, on moving out of register, the two sets of die orifices extrude separate net strands which are recombined into net intersections on the next registration of the die orifice sets. Alternatively the die orifices in each die member extrude separate net strands which make contact and adhere external to the dies to form net intersections and hence a net structure.

An object of the present invention is to provide extrusion apparatus of the type set forth above for producing an extruded net the meshes of which have increased tensile strength.

The invention consists in apparatus for extruding plastic netting in tubular or cylindrical form through co-axial, circular, relatively rotating, die members each having a circumferentially extending series of extrusion die orifices wherein the die orifices in each set are arranged in spaced groups, the inter-group spacing influencing the mesh strand length between net intersections and the inter-orifice spacing in each group being such, in relation to the orifice size, that the plastic extruded through the grouped die orifices of each set when passing in register coalesce whereby the individual identities of the parallel and the crossing by strands merge to form bulk intersections in which substantially no separation of the individual strands persists.

In the accompanying drawings FIGURE 1 is a sectional elevation of plastic extrusion apparatus of suitable form for supplying plastic under pressure to rotary die carrying members according to the invention and shown in position in the lower part of the figure; FIGURE 2 is an end elevation of one form of the die carrying members according to the present invention; FIGURE 3 is a fragmentary sectional side elevation through a modified form of die means in the rotary die carrying members according to the present invention; FIGURE 4 is an end elevation of the rotary die carrying members as shown in FIGURE 3; FIGURE 5 shows net product according to the present invention, as extruded; FIGURE 6 shows the net product of FIGURE 5 after stretching to effect molecular orientation of the plastic in the net strands, and FIGURE 7 is an enlarged view of one of the net intersections shown in FIGURE 6.

In carrying the invention into effect according to the preferred mode employing die means which are to be moved in continuous circular paths, a pair of co-axial die-carrying members 1 and 2 are mounted to close the lower end of a forced feed plastic supply chamber 3 of extrusion apparatus of known general character, such as illustrated in FIGURE 1. The inner die-carrying member 1 is disc-like and is secured to a frusto-conical head 4 mounted on a shaft or tube 5 which extends through the supply chamber 3 and passes out through a tapering plug element 6 has its peripheral surface recessed with a pair of diametrically oppositely disposed plastic distributing channels, of which one channel 6a is shown in FIGURE 1 and which meet at 6c opposite the plastic supply orifice 7 which receives plastic from a suitable source via the pressure worm 8. The channels, of which 6a is one, are divergent in the direction of the chamber 3 to disperse the plastic around the entry to the chamber. The shaft 5 passes through a thrust bearing 9 and is axially adjustably secured by nut 10 to lock-nut 10a. When motion is to be imparted to inner die member 1 the shaft is driven through a chain wheel 11 and chain 11a from any suitable power source or any other appropriate means may be provided to impart motion to said shaft.

The outer die-carrying member 2 is annular and is located around the inner die member 1, and is detachably mounted on a supporting member 12 which also serves as the outer walling of the lower part of the chamber 3. This member may be a fixture if it is intended that the outer die member 2 should permanently be stationary. When the outer die member 2 is to be rotated the supporting member 12 is mounted as shown in bearings carried by the outer two-part housing 13 of the apparatus. The housing 13 may be provided with electrical heating elements 13a and, in general, the apparatus may be supplied with heating means where required. The bearings for the member 12 are preferably of the tapered roller thrust type as shown at 12a in FIGURE 1. For the purpose of rotating the outer die member 2 and its support 12 a chain wheel drive 12b may be provided or rotation may be imparted by any other suitable drive means from a convenient power source.

The adjacent peripheral surfaces of the two die members 1 and 2 are accurately ground to provide slideway surfaces 14 which guide and maintain the accurate relationship during motion of the dies carried by the members and in order to provide for the supply of plastic from the chamber 3 to the die means 15 (described hereafter) of the die member 1 and 2, feed ducts are provided in known manner to communicate with an annular reservoir 18 from which the die means 15 are supplied as described in our British Patent No. 925,658, in the slideway surfaces 14. While the ground slideway surfaces may be cylindrical, they are preferably frusto-conical with the smaller end of the cone disposed towards the supply source, or alternatively, if desired the taper of the conical surfaces may be reversed so that the pressure in the chamber serves to maintain a close slideway junction.

Both die-carrying members may be detachably engaged with their mounting means, as indicated in FIGURE 1, in order that they may be replaced by other die members having a different arrangement or size of dies.

The die means 15 may comprise, in each die member 1 and 2, a circumferentially extending series of spaced die grooves 15' (FIG. 2) formed in the contact surfaces of the die members on the side of the annular reservoir 18 remote from the plastic supply chamber 3. As described in the aforementioned patent specification No. 836,555, the relative rotation between the die members causes the die orifices of each member to be moved into and out of opposite register, the effect being that when in register net intersections are extruded and when out of register net strands are extruded.

Alternatively, the die means 15, in each die member 1 and 2, may comprise a circumferentially extending series of spaced die bores 15" (FIGS. 3 and 4), extending from the plastic supply chamber 3 either direct (see FIG. 3) or through an annular reservoir such as 18 (FIG. 1). Plastic is extruded through the bores 15" as strands which make crossing contact and adhere, external to the dies, to produce the net structure. The die bores 15" are preferably inclined towards each other and open into a groove 20 in the faces of the die members 1 and 2 (see FIG. 3).

The die orifices 15' and 15" are arranged in equally spaced groups G and the die orifices of each group are also at equal spacing S. The inter-group spacing $Sg$ is at least as large as the arcuate extent of each group G and the interorifice spacing S in each group G is preferably of the same order as the width (or gauge) $w$ of each die orifice measured circumferentially of the die member. The inter-group spacing $Sg$ is usually dictated by the number of groups in a given die circle, but the inter-group spacing $Sg$ does influence the mesh strand length between intersections together with the net haul off rate and rate of die rotation. The inter-orifice spacing S in each group G is such that as the plastic is extruded therefrom, especially when forming net intersections 30 (see FIG. 5) (i.e. when one group of die orifices in one die member is moving past a group of die orifices in the other die member) the separate strand structure 31 of the extrudate is largely or wholly obliterated and there is a merging of the plastic between the closely adjacent orifices 15' or 15" of each group G to provide a massive net intersection 30 made of merged strands 31 to the number of $x$ where $x$ is the number of die orifices in each group.

Thus the net product produced comprises a structure wherein each of the net strands 31 is composed of a plurality of net strand filaments 32, a substantially large proportion of which have merged or coalesced and wherein the net intersections 30 are bulky and composed of a summation of the crossing filaments 32 forming the net strands 31.

While the inter-orifice spacing S in each group G and the inter-group spacing $Sg$ may vary according to the plastic material used and the product required, i.e. net mesh size and net strand gauge, a suitable example of satisfactory dimensions is: width (or gauge) $w$ of each die orifice 20 thousandths of an inch, inter-orifice spacing S in each group 30 thousandths of an inch (centre to centre measurement between adjacent orifices in a group, i.e. 10 thousandths of an inch gap or land between the adjacent edges of adjacent orifices), inter-group spacing $Sg=100$ thousandths of an inch (1/10 of an inch) measured between the trailing edge of the last orifice of one group G and the leading edge of the first orifice of the next succeeding group G.

When the apparatus is set in motion, close or even merging groups of net strands 31 are extruded through each group G of die orifices 15' or 15" while no groups are in passing registration, and as the groups pass one another composite, merging or confluent, net intersections 30 are extruded and are of filled-in rhomboidal form, in which the individualities of the intersecting strands tend to become merged, so that a relatively bulky, solid, intersection mass is formed at each intersection 30. Thus, in the intersections, substantially no separation of the individual strands persists.

The netting so extruded, when of a molecularly orientatable plastic material, may be subjected to stretching either in longitudinal (i.e. as extruded) or transverse directions or both (see FIGS. 6 and 7) to cause elongation of the net strands 31' (as group) while leaving the bulky net intersections 30 substantially unstretched or unaltered, whereby the net strands 31' become molecularly orientated and of improved tensile strength and reduced ductility.

I claim:

1. In apparatus for continuously extruding integral plastic netting in tubular form comprising a pair of coaxial, circular, relatively rotating die members each having a circumferentially extending series of cooperating complementary die orifices, and means for relatively rotating said die means to move the cooperative complementary die orifices into and out of registration one with the other during extrusion; the improvement which comprises die members wherein the circumferentially intending series of die orifices in each die member are arranged in spaced groups, the spacing between groups being at least as large as the arcuate extent of each group in the series, and the spacing between orifices in each group being such, in relation to the orifice size, that plastic extruded through the grouped die orifices of one die member when passing in register with the complementary grouped die orifices of the other die member coalesce whereby the individual identities of the parallel and the crossing net strands merge to form bulk net intersections in which substantially no separation of individual strands persists.

2. Apparatus for extruding plastic netting as claimed in claim 1 wherein the die orifices in each group comprise open sided grooves such that when a die orifice in one die member is in register with the die orifice of another a composite extrusion orifice is momentarily created.

3. Apparatus for extruding plastic netting as claimed in claim 1 wherein the die orifices comprise strand-extruding bores, the disposition of the die orifices in the two die members being such that as the groups of die orifices pass one another the strands extruded from the die orifices make contact and adhere to form coalesced net intersections.

References Cited by the Examiner

UNITED STATES PATENTS

| | | | |
|---|---|---|---|
| 2,639,248 | 5/1953 | Oveholt | 161—89 |
| 2,825,158 | 3/1958 | Ekman | 161—89 |
| 2,919,467 | 1/1960 | Mercer | 18—12 X |
| 3,070,840 | 1/1963 | Mercer | 18—12 |
| 3,112,526 | 12/1963 | Martin | 18—12 |
| 3,118,180 | 1/1964 | Nalle | 18—2 X |
| 3,163,691 | 12/1964 | Anderson et al. | 18—12 X |

WILLIAM J. STEPHENSON, *Primary Examiner.*

J. SPENCER OVERHOLSER, *Examiner.*

L. S. SQUIRES, *Assistant Examiner.*